Sept. 3, 1968   M. KUTS   3,400,034
BRAKE ADHESIVE TAPE APPLIER
Filed Oct. 14, 1966   2 Sheets-Sheet 1
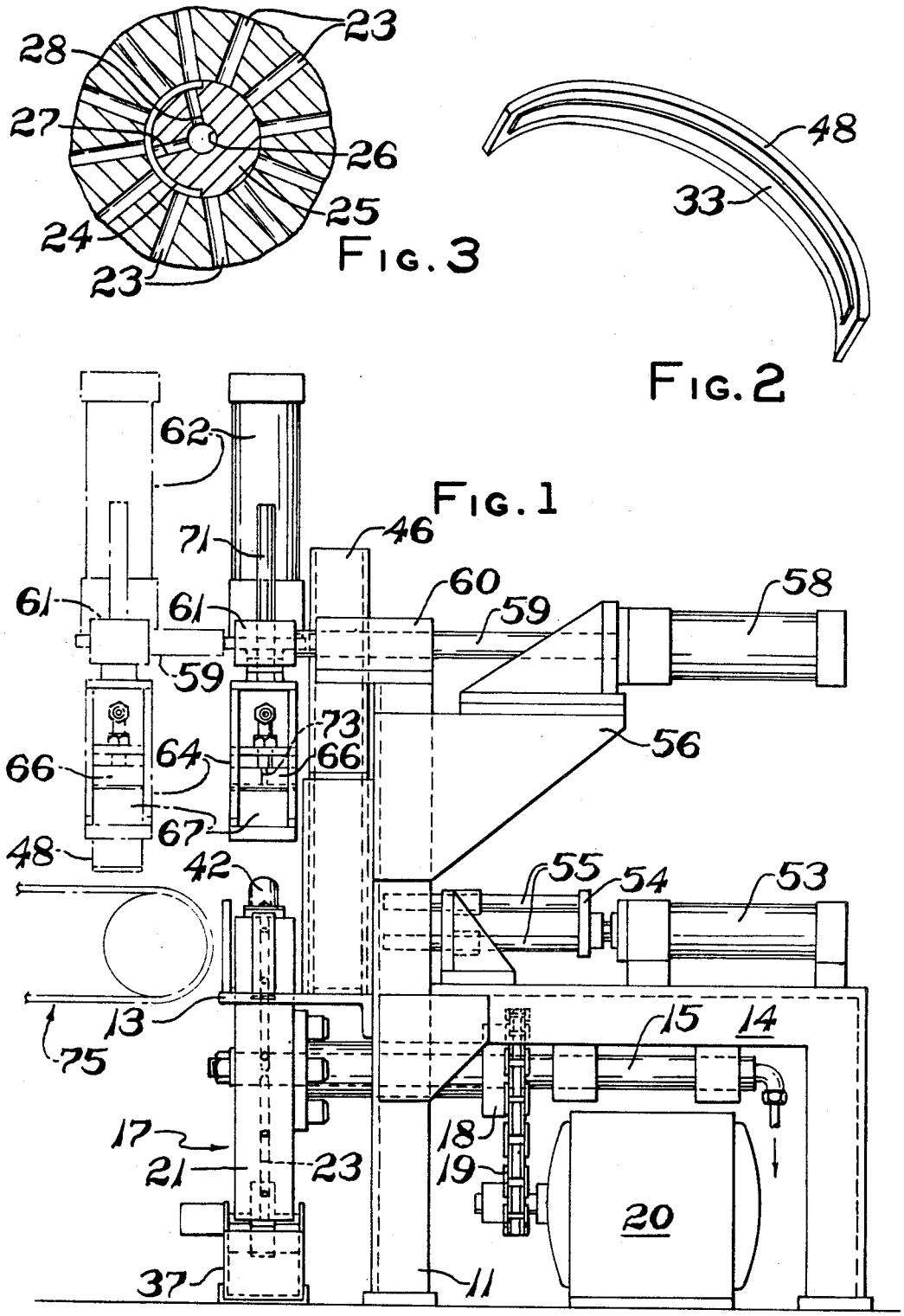

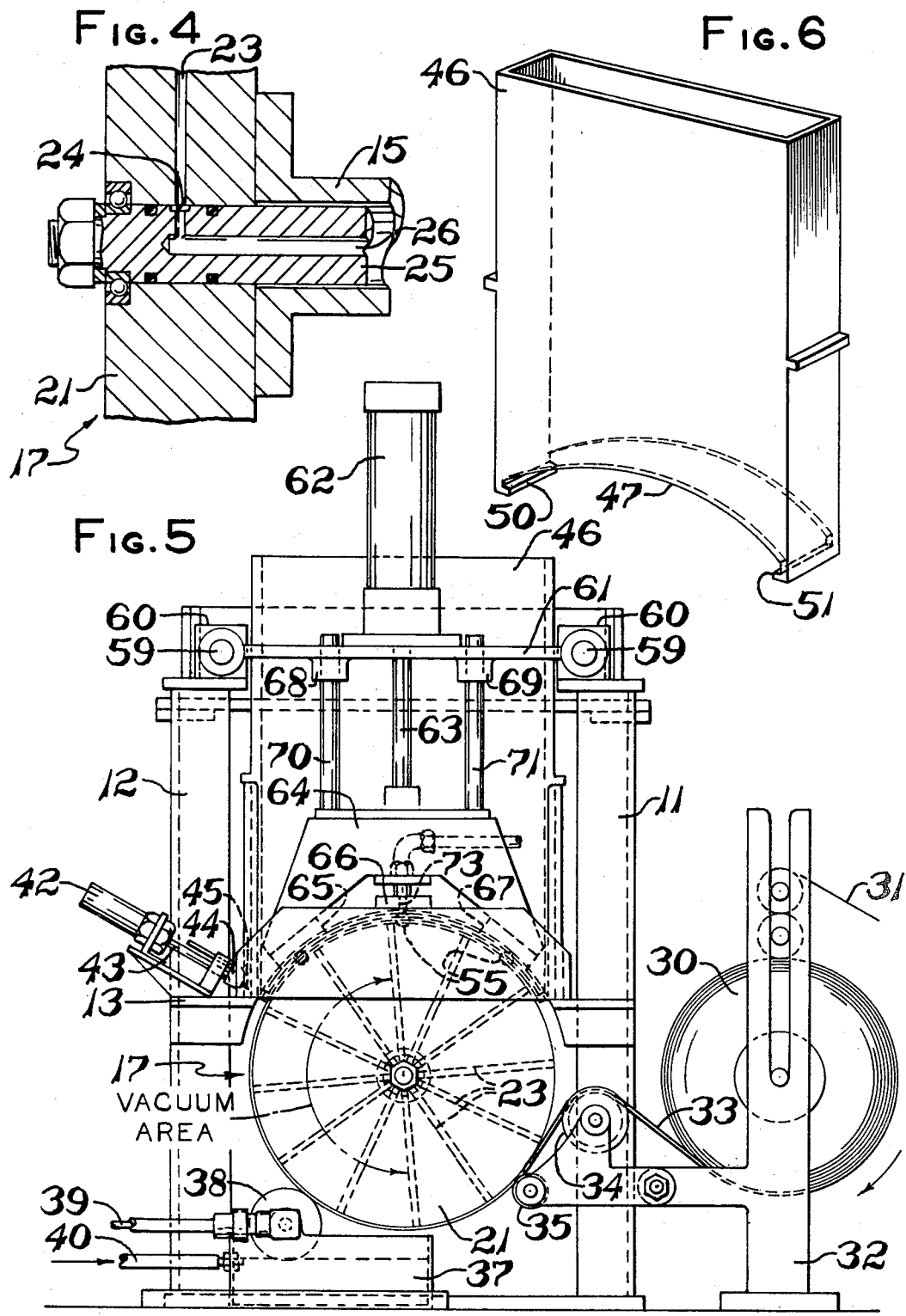

United States Patent Office 3,400,034
Patented Sept. 3, 1968

3,400,034
BRAKE ADHESIVE TAPE APPLIER
Mathew Kuts, Akron, Ohio, assignor to The B. F. Goodrich Company, New York, N.Y., a corporation of New York
Filed Oct. 14, 1966, Ser. No. 586,831
8 Claims. (Cl. 156—517)

ABSTRACT OF THE DISCLOSURE

Apparatus for applying adhesive tape to the inside surface of a brake lining segment, including means to apply adhesive to the tape, means to cut the tape to the required length and means to press the brake lining segment and tape into bonded relationship.

---

This invention relates to a brake tape applier and more particularly to an apparatus for applying bonding tape to the inside surface of a brake lining segment.

The manufacture of brake lining for brake shoes was customarily made by extruding a resin or cement onto the inner circumferentially extending surface of the linings after which such brake linings were placed on a continuously moving belt which passed into an oven for drying. In certain instances during such process, the resin would flow beyond the side edges of the brake lining and would require trimming. Thereafter, the brake lining would be stored. In the storage of such linings the stacking of the linings would cause adherence between the linings thereby requiring further manual manipulation. Prior to the application of such brake linings onto the rim of the brake shoes, the individual brake linings would require separation in preparation for the next operation which was the manual insertion of such linings into a press for adhering such brake lining onto the brake shoe. The present invention contemplates the storage of the brake linings without any application of cement, thereby eliminating the trimming and the sticking of the individual brake linings to adjoining brake linings. Such is accomplished by the application of a brake adhesive tape to the lining, which tape would provide the function of adhering the brake lining to the brake shoe which would be done under pressure to form a positive union therebetween. Prior to the application of such linings to the brake shoe, it is only necessary to load the brake linings into the brake tape applier apparatus with the brake linings being automatically individually fed to a prepared bonding tape that has adhesive applied thereto, after which such brake linings are applied directly to the brake shoe, eliminating intermediate storage, breakage, drying and rendering such operation more economical.

The present invention contemplates the use of a vacuum drum which advances bonding tape past a pressure sensitive adhesive and cut-off mechanism which severs a measured length of tape. A magazine supply means positions and presses a brake lining on the severed tape for adherence thereto and thereafter the brake shoe is transferred to a takeaway conveyor for direct use in the assembling of a brake shoe assembly.

It is an object of this invention to provide a device for applying brake adhesive tape to a brake lining.

A further object of this invention is to provide an economical device for applying brake adhesive tape to a brake lining.

A further object of this invention is to provide a brake adhesive tape dispenser which is inexpensive, mobile and yet automated to provide economical means to supply tape to brake linings.

These and other objects and advantages will appear more fully in the following detailed description when considered in connection with the accompanying drawings in which:

FIG. 1 is a side elevation of the brake adhesive tape dispensing apparatus.

FIG. 2 is a perspective view of the brake lining with the tape adhered thereto.

FIG. 3 is a fragmentary cross-sectional view of the central portion of the vacuum drum.

FIG. 4 is a cross-sectional view showing a portion of the drum, tubular shaft and the vacuum supply conduit.

FIG. 5 is a front elevational view of the brake adhesive tape dispenser.

FIG. 6 is a perspective view of the brake lining hopper.

Referring to the drawings wherein like reference characters designate like or corresponding parts throughout the several views, there is shown in FIGS. 1 and 5 a pair of support frames 11 and 12 which have a forwardly extending horizontal plate 13 and a rearwardly extending horizontal support frame 14 at the intermediate portion thereof. Rearwardly extending horizontal support frame 14, in cooperation with the pair of vertically extending support frames 11 and 12, support for rotation a tubular shaft 15 which has a vacuum drum 17 mounted on one end thereof. Vacuum drum 17 is indexed through a movement of 120° as controlled by a clutch means 18 which receives its power from a sprocket 19 driven from a motor 20. Vacuum drum 17 comprises an annular cylinder 21 having a plurality of radially extending passageways 23 which are adapted to communicate with an annular recessed portion 24 on one end of a stationary shaft 25, which shaft 25 is journalled in tubular shaft 15. Stationary shaft 25 has a longitudinally extending bore 26 which communicates with the recessed portion 24 via radially extending bores 27 and 28 which as shown in FIG. 5 are adapted to provide a vacuum to half of the radially extending passageways 23. As drum 17 is indexed relative to shaft 25, different passageways 23 come in communication with the recessed portion 24 to selectively control the area of the drum which is subject to the vacuum. As the drum is indexed, the ascending peripheral portion of the drum is subject to the vacuum to hold the tape onto the periphery thereof. The descending peripheral portion has no vacuum applied thereto since the first portion thereof would have the benefit of gravity to retain the strip of tape thereto and the latter part thereof has no tape to hold. The other end portion of bore 26 is suitably connected to a vacuum pump which pulls a vacuum in such recessed portion 24 for a purpose to be described. A tape storage reel 30 suitably mounted on space supports 32 supplies a tape 33 which is directed onto the vacuum drum 17 by a pair of idler rollers 34 and 35 after which such tape 33 is held onto the drum 17 through the suction provided on the drum 17 by the recessed portion 24 on the stationary shaft 25 through the passageways 23. The rollers immediately above the storage reel 30 direct the liner 31 away to another storage reel (not shown) in a manner clearly understood in the art. Closely adjacent the lower portions of the indexable vacuum drum 17 is a storage tank 37 which is filled with a suitable adhesive cement which through an applicator roller 38, driven by a flexible shaft 39, supplies a predetermined amount of adhesive to the exposed portion of the tape 33 as such tape is indexed past the roller 38. Cement is supplied to the tank 37 and maintained at a predetermined level via a conduit 40 from a suitable source, not shown, in a manner clearly understood in the art. Mounted on the forwardly extending horizontal plate 13 is a knife cylinder 42 which has its piston rod 43 suitably connected to a knife head 44 having a cut-off blade 45 suitably mounted thereon. Pressurization of the head end of cylinder 42 effects radial inward movement of the blade 45 to sever the tape 33 held on the vacuum drum 17 and the pressurization of the rod end of cylinder 42 effects retraction of the blade 45 from the vacuum drum 17. Also mounted on the horizontal plate 13 is a hopper 46 which is open at its upper end portion to facilitate the loading of brake linings therein. The lower end portion of said hopper is arcuately recessed as at 47 to the contour of the arcuately shaped brake linings 48 to facilitate the unloading of such brake linings 48 onto the vacuum drum. The respective lower side edge portions of the hopper have a pair of inwardly extending rib portions 50 and 51 which act as a stop which limit the downward movement of the respective brake linings. As seen in FIG. 6, there is sufficient clearance space between the ribs 50, 51 and the arcuately shaped recess 47 to permit the removal of the lowermost brake lining 48 from the hopper 46. Mounted rearwardly of the hopper 46 on the horizontally extending support frame 14 is a pneumatic cylinder 53 having its piston rod connected via a bracket 54 to a plurality of horizontally extending rods 55 which upon energization of the head end of pneumatic cylinder 53 displace the lowermost brake lining from the hopper 46 onto the vacuum drum 17. Upon retraction of the piston rod of cylinder 53, and the respective rods 55 a brake lining falls into position on ribs 50 and 51 preparatory to the next cycle of operation for positioning a brake lining onto the vacuum drum 17. Extending upwardly and rearwardly of the vertical support frames 11 and 12 is a support frame 56 which has secured to it a pair of pneumatic cylinders 58 (only one shown in FIG. 5) having their respective piston rods 59 extending through suitable bosses 60 in the support frames 11 and 12 which guide the rectangular movement of the piston rods. Secured to the forwardmost end portion of such piston rods is a horizontally extending cross head bracket 61 which has secured to it a vertically disposed cylinder 62. Cylinder 62 has a downwardly extending piston rod 63 which has secured to its lowermost end portion a bracket 64, which bracket 64 has a plurality of arcuately spaced pads 65, 66 and 67. Upon pressurization of the head end of cylinder 62, the pads 65, 66 and 67 are moved downwardly into contact with the brake lining disposed on the upper end portion of vacuum drum 17 to apply pressure thereto to effect adherence of the brake adhesive tape to the brake lining (FIG. 2). Cross head 61 has a pair of bosses 68 and 69, with bores extending vertically therethrough, which provide guideways for a pair of guide rods 70 and 71 which are connected to the bracket 64 to assure the alignment of the pads 65, 66 and 67 relative to the brake lining 48. Pressure pad 66 has an opening communicating with a passageway 73 in such bracket 64, which passageway 73 is connected to a suitable vacuum source, which pulls a controlled vacuum therethrough to retain the brake lining thereon for transferring such brake lining. With the brake lining retained on bracket 64 and upon pressurization of the rod end of pneumatic cylinder 62, the brake lining is moved upwardly away from the vacuum drum 17. Upon pressurization of the head end of pneumatic cylinder 58 the brake lining is then adapted to be moved away from the vacuum drum 17 and the tape applier apparatus for positioning onto a takeaway conveyor 75 such that upon release of the vacuum in passageway 73 the brake lining will fall onto such conveyor 75. Thereafter the rod end of pneumatic cylinder 58 is pressurized to return the bracket 64 to the position shown in full lines in FIG. 1.

In the operation of the tape dispensing apparatus, it is assumed that the tape 33 has been indexed by the motor 20 through the clutch 18 such that the tape 33 is retained on the vacuum drum 17 by the vacuum which is pulled through the passageways 23 from bore 26 which is supplied from a suitable source, not shown. As the tape is indexed by the vacuum drum 17, adhesive is applied to the outer surface of such tape through an applicator roller 38 which is mounted adjacent to such drum 17 and has a portion thereof exposed to the adhesive in tank 37 thereby applying a thin coat of adhesive to such tape. As such vacuum drum 17 is indexed from position A to position B as indicated in FIG. 5, the tape is positioned for application to the brake lining. The head end of pneumatic cylinder 42 is then pressurized which extends to cutter blade 45 radially inwardly to sever the tape at the position indicated as A. The blade is then retracted by the pressurization of the rod end of pneumatic cylinder 42 and thereafter the head end of pneumatic cylinder 53 is pressurized. The piston rod of cylinder 53 and bracket 54 is extended outwardly in the leftward direction as viewed in FIG. 1 such that the respective rods 55 push the brake lining from hopper 46 onto the vacuum drum 17. The rod end of pneumatic cylinder 53 is then pressurized to retract the rods 55 allowing a brake lining 48 to seat its end portions on the ribs 50, 51 in preparation for the next indexing operation. The head end of pneumatic cylinder 62 is then pressurized to move the piston rod 63, and bracket 64 downwardly such that pads 65, 66 and 67 move downwardly into abutting engagement with the brake lining to press such brake lining against the strip of adhesive between locations A and B on the vacuum drum. The vacuum is maintained in bore 26; however, such vacuum is only sufficient to maintain the tape in position on the drum. A vacuum is then pulled through passageway 73 to exert a suction on the brake lining positioned on the vacuum drum 17. Such vacuum pulled through passageway 73 is relatively great compared so that pulled through passageways 23. That rod end of pneumatic cylinder 62 is then pressurized which moves the brake lining along with the strip of tape adhered thereto upwardly away from the vacuum drum 17 to the position shown in full lines in FIG. 1. With such action, the head end of pneumatic cylinder 58 is pressurized which extends the bracket 61 outwardly to the position shown in dotted lines in FIG. 1 which upon release of the vacuum in passageway 73 permits the release of the brake lining onto the takeaway conveyor 75. The rod end of pneumatic cylinder 58 is then pressurized to retract the bracket 61 to the position shown in full lines in FIG. 1, and condition such apparatus for the next cycle of operation. Simultaneously with such action, the vacuum drum 17 is indexed 120° thereby positioning another section of tape between positions A and B for severence in preparation for the application of a brake lining to the tape in the manner described above.

Obviously, many modifications and variations of the present invention are possible in light of the above teachings. It is, therefore, to be understood, that within the scope of the appended claims, the invention may be practiced otherwise than as specifically described.

What is claimed is:

1. An apparatus for applying tape to brake linings comprising a support frame having a drum mounted thereon; means connected to said drum for indexing said drum; supply means for feeding a tape to the peripheral surface of said drum; a cement applier mounted adjacent to said drum for applying a thin layer of cement to such tape on said drum; said drum having suction means for retaining said thereon; cutoff means mounted adjacent to said drum for selective movement to and from said drum for severing such tape in strips; means for feeding an arcuately shaped brake lining onto said drum in abutting engagement with said severed tape; and reciprocable press means for forcing said brake lining into abutting engagement with said severed tape section.

2. An apparatus as set forth in claim 1 wherein said press means includes means for transferring said brake lining onto a discharge conveyor means.

3. An apparatus as set forth in claim 2 wherein said transferring means includes suction means selectively operable to hold said brake lining thereon for transferring said brake lining to said discharge conveyor means.

4. An apparatus as set forth in claim 1 wherein said supply means comprises a storage reel and a plurality of guide rollers for guiding said tape onto the peripheral surface of said drum; said drum having a stationary hub portion; said hub being recessed and communicating with a vacuum source; said drum having a plurality of radially extending passageways communicating with said hub; said recessed portion communicating with certain ones of said passageways whereby said drum holds said tape to said drum on a portion of the periphery thereof through the suction exerted thereon.

5. An apparatus as set forth in claim 1, wherein said drum is mounted on a stationary hub; said hub having a bore communicating with a vacuum source; said having a plurality of radially extending passageways that communicate with said hub and are open to the peripheral surface of said drum; and said drum having a horizontal axis such that a vertical plane passing through said axis and containing said axis separates the peripheral surface of said drum into an ascending peripheral surface and a descending peripheral surface; said hub having a recessed portion which communicates said bore with the passageways in said drum that are located in the portion of said drum that are open to said ascending peripheral surface.

6. An apparatus as set forth in claim 4 wherein said means for feeding an arcuately shaped brake lining onto said drum comprises a hopper having a lower arcuately shaped opening with shoulders at the respective sides thereof, and pusher means selectively operable to move past said shoulders in said arcuately shaped opening to deposit a brake lining onto said drum.

7. An apparatus as set forth in claim 6 wherein said press means includes a plurality of arcuately spaced pads with suction means connected thereto for transferring said brake lining away from said drum onto a discharge conveyor.

8. An apparatus as set forth in claim 5 wherein said means for feeding an arcuately shaped brake lining onto said drum comprises a hopper having a lower arcuately shaped opening with shoulders at the respective sides thereof, pusher means mounted adjacent to said hopper and being selectively operable to move past said shoulders in said arcuately shaped opening to deposit a brake lining onto said drum, said press means including suction means selectively operable for transferring said brake lining away from said drum onto a discharge conveyor, and said suction means in said press means being of greater relative magnitude than said suction means in said drum for retaining said tape.

No references cited.

EARL M. BERGERT, *Primary Examiner.*

W. E. HOAG, *Assistant Examiner.*